US011575315B2

(12) United States Patent
Fu et al.

(10) Patent No.: US 11,575,315 B2
(45) Date of Patent: Feb. 7, 2023

(54) TOTEM-POLE POWER FACTOR CORRECTION CIRCUIT

(71) Applicant: Delta Electronics (Shanghai) Co., Ltd., Shanghai (CN)

(72) Inventors: Qi Fu, Shanghai (CN); Haibin Song, Shanghai (CN); Daofei Xu, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 27 days.

(21) Appl. No.: 17/405,852

(22) Filed: Aug. 18, 2021

(65) Prior Publication Data

US 2022/0209653 A1 Jun. 30, 2022

(30) Foreign Application Priority Data

Dec. 31, 2020 (CN) .......................... 202011628352.3

(51) Int. Cl.
H02M 1/42 (2007.01)
H02M 1/12 (2006.01)

(52) U.S. Cl.
CPC ........... *H02M 1/4233* (2013.01); *H02M 1/12* (2013.01)

(58) Field of Classification Search
CPC .................. H02M 1/42–4233; H02M 1/12
See application file for complete search history.

(56) References Cited

U.S. PATENT DOCUMENTS

| 2014/0354247 | A1  |   | 12/2014 | Xu et al. |
|---|---|---|---|---|
| 2015/0180330 | A1 | * | 6/2015 | Ye ............................ H02M 7/46 363/126 |
| 2016/0241132 | A1  |   | 8/2016 | Lin et al. |
| 2018/0062504 | A1 | * | 3/2018 | Mei ........................... G05F 1/70 |

FOREIGN PATENT DOCUMENTS

| CN | 100492847 | C |   | 5/2009 |   |
|---|---|---|---|---|---|
| CN | 102104324 | A |   | 6/2011 |   |
| CN | 102624213 | B |   | 12/2014 |   |
| CN | 108809074 | A |   | 11/2018 |   |
| CN | 109690931 | A | * | 4/2019 | ....... G01R 19/16538 |
| CN | 109690931 | A |   | 4/2019 |   |
| CN | 110768549 | A |   | 2/2020 |   |
| TW | 201838310 | A |   | 10/2018 |   |
| TW | 202013874 | A |   | 4/2020 |   |
| WO | 2017157250 | A1 |   | 9/2017 |   |
| WO | WO-2017157250 | A1 | * | 9/2017 | .............. H02M 1/38 |

* cited by examiner

Primary Examiner — Sisay G Tiku
(74) Attorney, Agent, or Firm — Kirton McConkie; Evan R. Witt

(57) ABSTRACT

A totem-pole PFC circuit is provided. The totem-pole PFC circuit includes an inductor, a first bridge arm and a second bridge arm. The first bridge arm includes a first switch and a second switch connected in series. A first middle node connected between the first and second switches is coupled to a first terminal of an AC power source through the inductor. The second bridge arm connected to the first bridge arm in parallel includes a third switch and a fourth switch connected in series. A second middle node connected between the third and fourth switches is coupled to a second terminal of the AC power source. When a polarity of the AC power source is changed, a change time of a voltage on the second middle node is longer than a preset time not less than 20 μs.

18 Claims, 14 Drawing Sheets

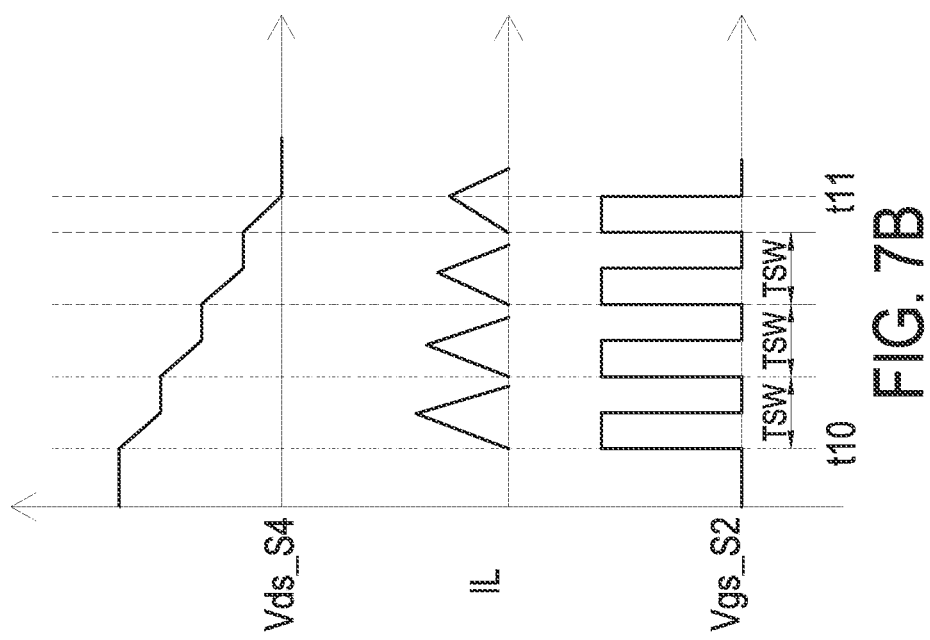

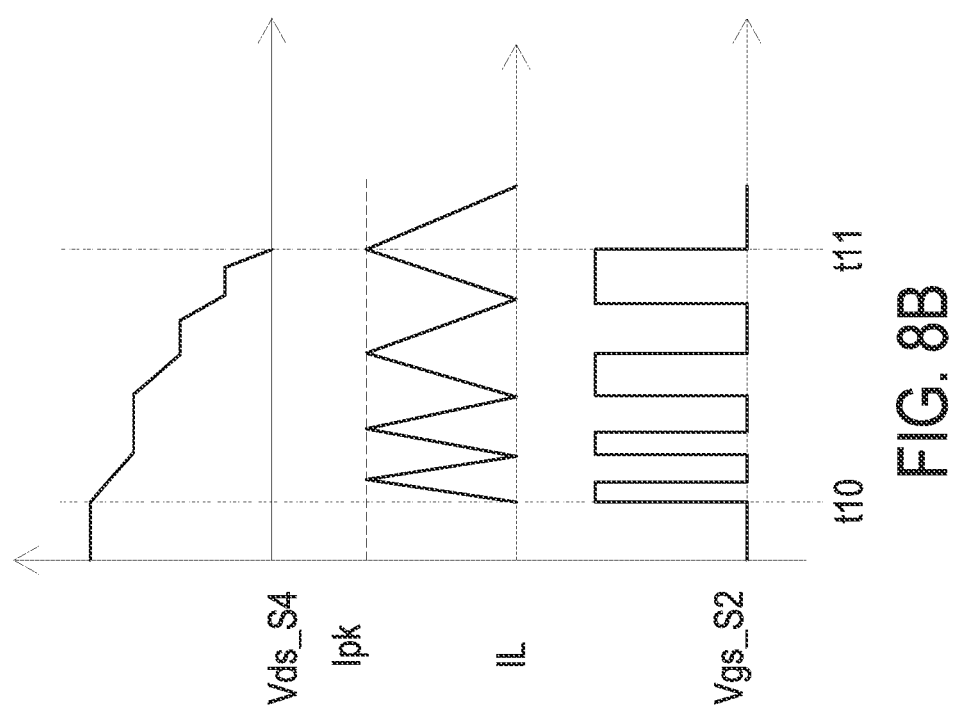

US 11,575,315 B2

TOTEM-POLE POWER FACTOR CORRECTION CIRCUIT

CROSS-REFERENCE TO RELATED APPLICATION

This application claims priority to China Patent Application No. 202011628352.3, filed on Dec. 31, 2020, the entire contents of which are incorporated herein by reference for all purposes.

FIELD OF THE INVENTION

The present disclosure relates to a PFC (power factor correction) circuit, and more particularly to a totem-pole PFC circuit.

BACKGROUND OF THE INVENTION

Generally, high power adapters need a two-stage circuitry structure. The first-stage circuit utilizes a boost PFC circuit (as shown in FIG. 1) to control the harmonic current, and the second-stage circuit utilizes a DC/DC converter to adjust the output voltage. Recently, with the development of the miniaturization of power adapters, the operating frequency has become higher and higher, and the needs to efficiency become higher as well. The loss caused by the rectifier bridge in the conventional boost PFC circuit is about one-fifth of the total loss of the power adapter, which becomes a major obstacle to further improving efficiency.

The dual-boost PFC circuit (as shown in FIG. 2) can be used to replace the conventional boost PFC circuit for further improving efficiency. However, the dual-boost PFC circuit may cause common mode noise problems. Generally, the totem-pole PFC circuit (as shown in FIGS. 3A and 3B) can also improve efficiency like the dual-boost PFC circuit does. Moreover, in the applications which are not sensitive to leakage current, a Y capacitor with large capacitance can be used to suppress the common mode noise caused by the totem-pole PFC circuit. However, in the applications of power adapter, due to strict restriction on the leakage current, the capacitance of the Y capacitor is limited to a small value. Accordingly, when the capacitance of Y capacitor is limited, the common mode noise generated by the totem-pole PFC circuit cannot be suppressed effectively.

Therefore, there is a need of providing a totem-pole PFC circuit which overcomes the drawbacks mentioned above.

SUMMARY OF THE INVENTION

The present disclosure provides a totem-pole PFC circuit. When the polarity of the AC power is changed, the totem-pole PFC circuit controls the change time of the voltage on the middle node of the line frequency bridge arm to be longer than a preset time. Consequently, the common mode noise caused by the voltage jump is suppressed.

In accordance with an aspect of the present disclosure, a totem-pole PFC circuit is provided. The totem-pole PFC circuit has an input connected to an AC power source and an output providing a bus voltage. The totem-pole PFC circuit includes an inductor, a first bridge arm and a second bridge arm. The first bridge arm includes a first switch and a second switch connected in series. A first middle node connected between the first and second switches is coupled to a first terminal of the AC power source through the inductor. The second bridge arm is connected to the first bridge arm in parallel. The second bridge arm includes a third switch and a fourth switch connected in series. A second middle node connected between the third and fourth switches is coupled to a second terminal of the AC power source. When a polarity of the AC power source is changed, a change time of a voltage on the second middle node is longer than a preset time, and the preset time is not less than 20 µs.

The above contents of the present disclosure will become more readily apparent to those ordinarily skilled in the art after reviewing the following detailed description and accompanying drawings, in which:

BRIEF DESCRIPTION OF THE DRAWINGS

FIGS. 7A, 7B, 8A and 8B are schematic waveforms showing different implementations of controlling the switching sequence of the first and second switches of the first bridge arm.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
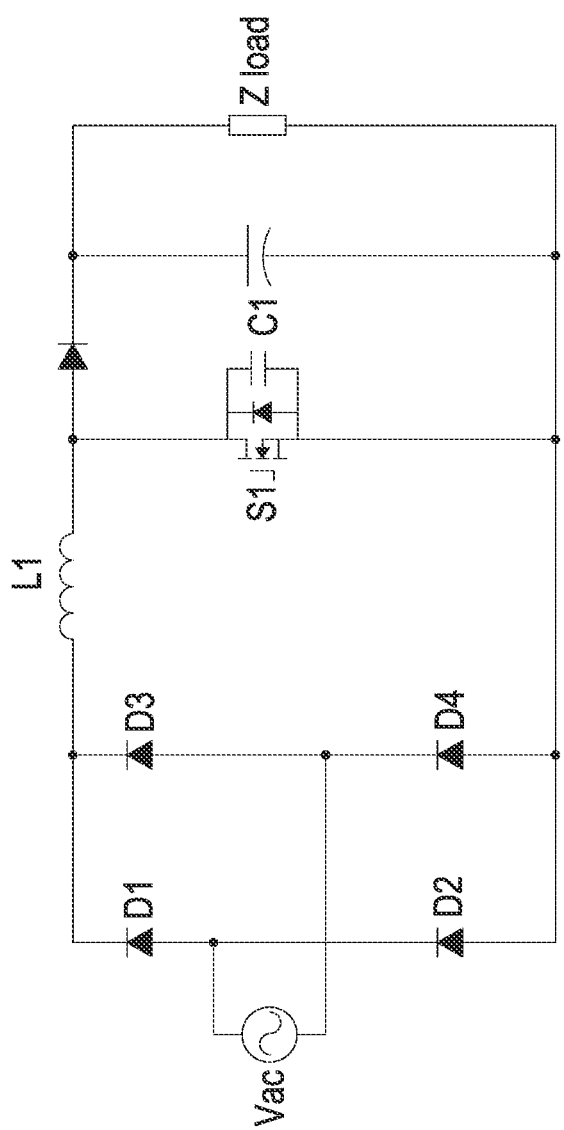
FIG. 1 is a schematic circuit diagram illustrating a conventional boost PFC circuit.
Figure 2:
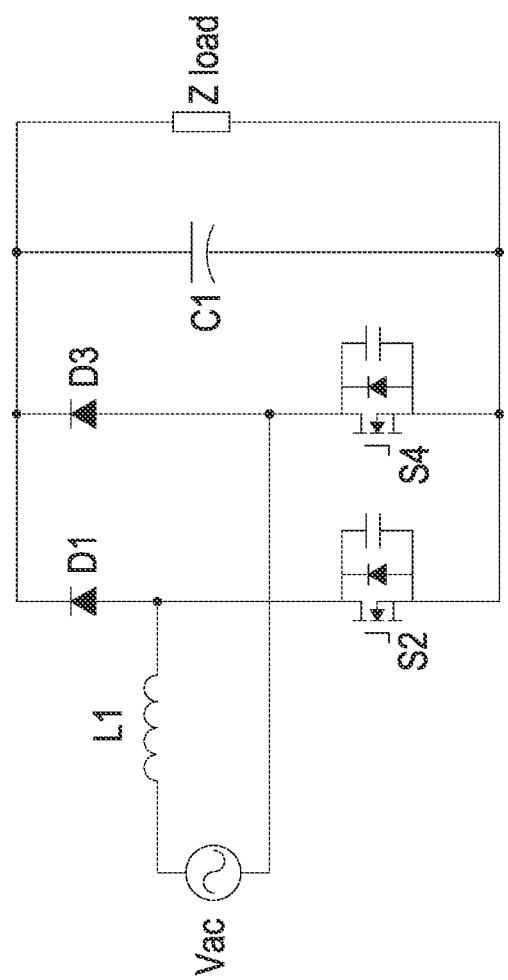
FIG. 2 is a schematic circuit diagram illustrating a conventional dual-boost PFC circuit.
Figure 3A:
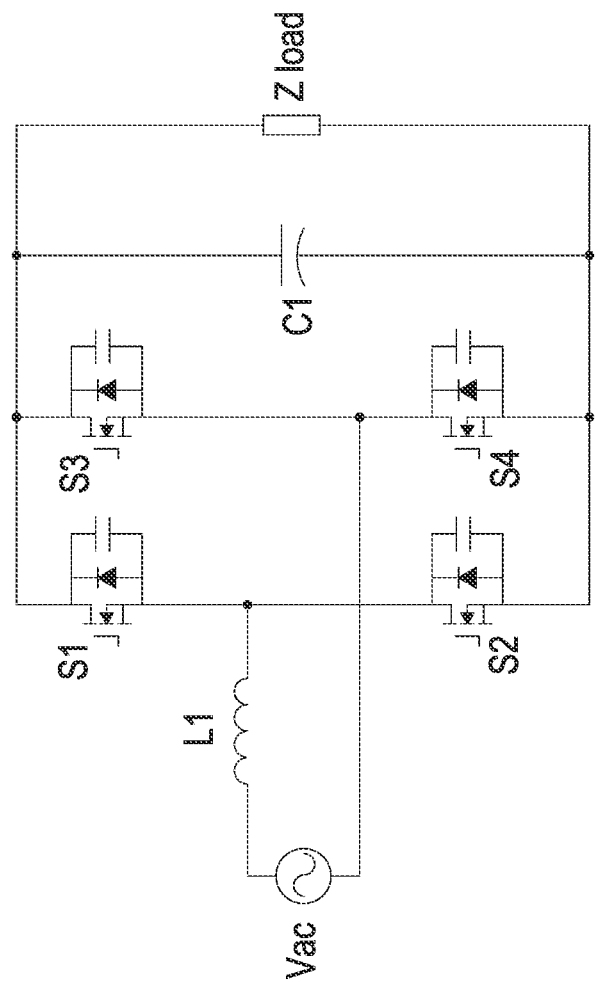
FIG. 3A is a schematic circuit diagram illustrating a totem-pole PFC circuit according to a first embodiment of the present disclosure.
Figure 3B:
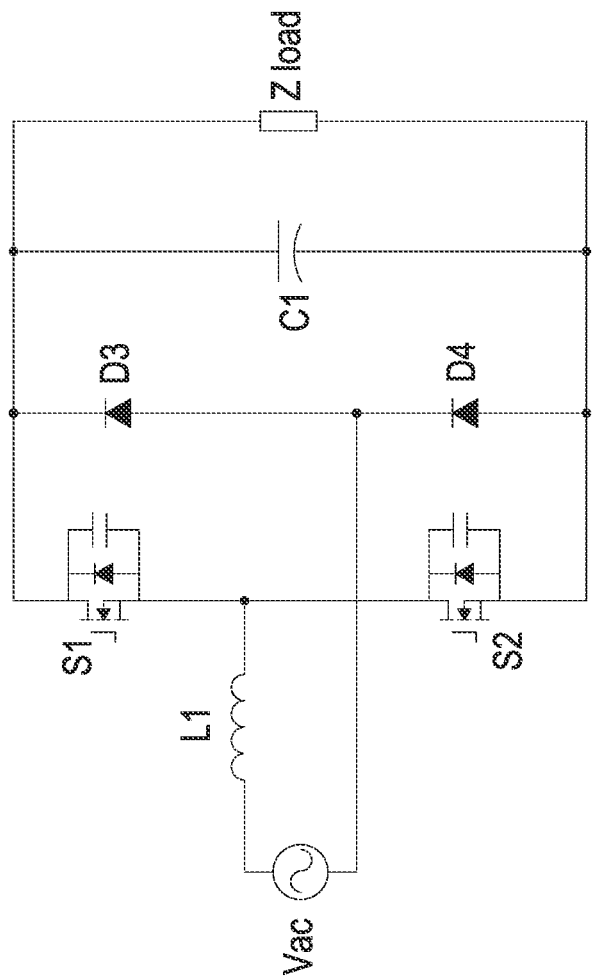
FIG. 3B is a schematic circuit diagram illustrating a totem-pole PFC circuit according to a second embodiment of the present disclosure.

FIG. 3A is a schematic circuit diagram illustrating a totem-pole PFC circuit according to a first embodiment of the present disclosure. FIG. 3B is a schematic circuit diagram illustrating a totem-pole PFC circuit according to a second embodiment of the present disclosure. As shown in FIG. 3A and FIG. 3B, the totem-pole PFC circuit (1a, 1b) includes an inductor L1, a first bridge arm and a second bridge arm (i.e., the line frequency bridge arm). The first bridge arm includes a first switch S1 and a second switch S2 connected in series, and a first middle node connected between the first and second switches S1 and S2 is coupled to a first terminal of an AC power source Vac through the inductor L1. The second bridge arm is connected to the first bridge arm in parallel. The second bridge arm includes a third switch and a fourth switch connected in series, which are designated as S3 and S4 respectively in FIG. 3A or are designated as D3 and D4 in FIG. 3B. A second middle node connected between the third and fourth switches is coupled to a second terminal of the AC power source Vac. The first and second switches S1 and S2 of the first bridge arm are for example but not limited to MOSFETs (metal-oxide-semiconductor field-effect transistors), IGBTs (insulated gate bipolar transistors), GaN transistors, or SiC transistors. In the first embodiment shown in FIG. 3A, the third and fourth switches S3 and S4 of the second bridge arm are transistors, for example but not limited to MOSFETs, IGBTs, GaN transistors or SiC transistors. In the second embodiment shown in FIG. 3B, the third and fourth switches D3 and D4 of the second bridge arm are diodes.

Taking the first embodiment shown in FIG. 3A as an example, the totem-pole PFC circuit 1a works normally. During the positive half cycle of the AC power source Vac, the third switch S3 is in the off state, the fourth switch S4 is in the on state, and the first switch S1 and the second switch S2 are turned on and off alternately. Under this circumstance, the second switch S2 is a main switch, and the first switch S1 is a freewheeling switch. The inductor L1 stores energy when the second switch S2 is in the on state, and the energy stored in the inductor L1 is transferred to a bus capacitor C1 when the first switch S1 is in the on state. During the negative half cycle of the AC power source Vac, the third switch S3 is in the on state, the fourth switch S4 is in the off state, and the first switch S1 and the second switch S2 are turned on and off alternately. Under this circumstance, the second switch S2 is a freewheeling switch, and the first switch S1 is a main switch. The inductor L1 stores energy when the first switch S1 is in the on state, and the energy stored in the inductor L1 is transferred to the bus capacitor C1 when the second switch S2 is in the on state. Based on the above operations of the bridge arms of the totem-pole PFC circuit 1a in the first embodiment shown in FIG. 3A, the operations of the bridge arms of the totem-pole PFC circuit 1b of the second embodiment shown in FIG. 3B can be derived, and thus the detailed descriptions thereof are omitted herein.

In the applications of power adapters, the bus voltage is usually about 400V. Therefore, relative to the reference ground, the line frequency (50/60 Hz) jumping of the neutral line of the AC power source Vac (i.e., the line frequency jumping on the second middle node) is a square wave signal with high and low levels of 400V and 0V respectively. Since the frequency spectrum of the common mode noise source is affected by the duration of the transition edge, the magnitude of the common mode noise source can be controlled through controlling the duration of the transition edge of the voltage on the second middle node. Consequently, the suppression of the common mode noise is achieved. In order to meet the criteria of EMI (electromagnetic interference), the duration of the transition edge is set to be longer than 20 μs in the present disclosure so that the noise caused by the common mode noise source can be greatly reduced or even ignored. In the present disclosure, it is noted that the change time of the voltage on the middle node of the line frequency bridge arm (i.e., the second middle node) is controlled to be longer than the preset time during the inversion of the polarity of the AC power source Vac. The preset time is not less than 20 μs. Consequently, the common mode noise caused by the line frequency jumping can be suppressed effectively. In some embodiment, the change time represents a first time period of the voltage on the second middle node increasing from zero to a bus voltage VBUS, or represents a first time period of the voltage on the second middle node decreasing from the bus voltage VBUS to zero.

In the present disclosure, the control for the change time of the voltage on the second middle node in the present disclosure includes two kinds of control methods, which are described in detail as follows.

Figure 4:
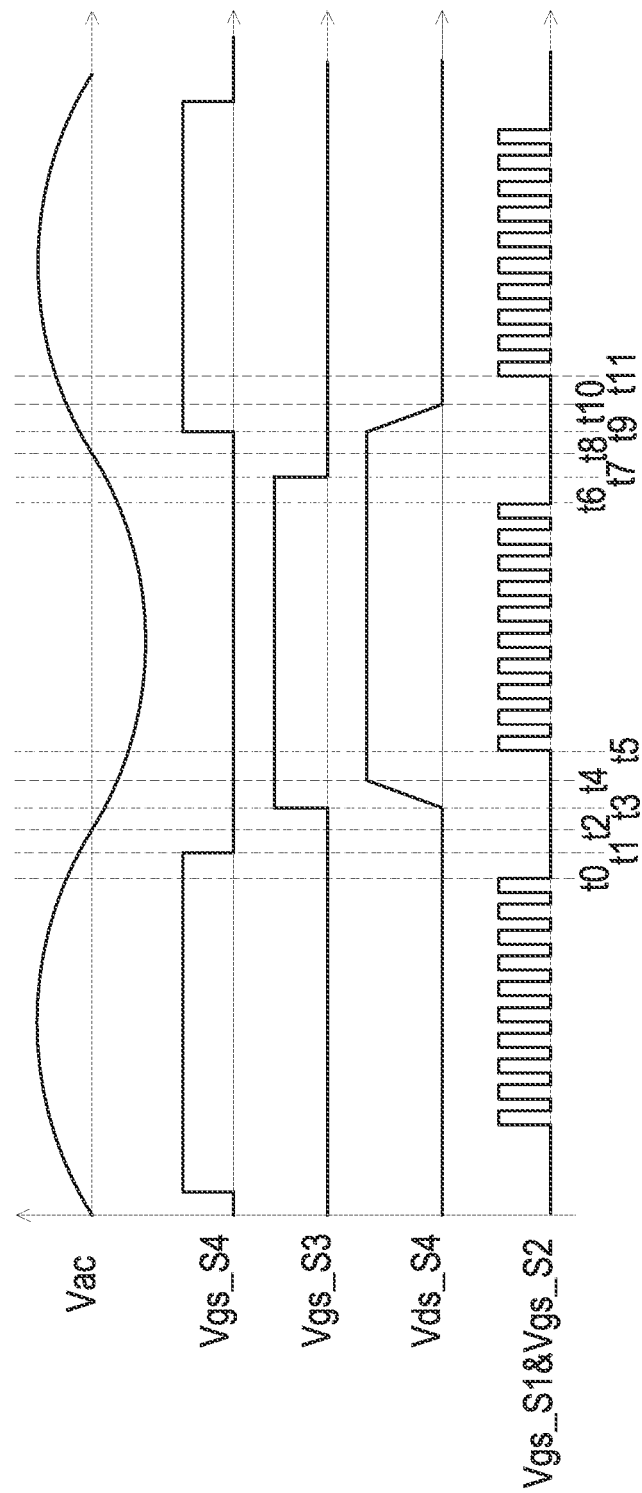
FIG. 4 is a waveform of the totem-pole PFC circuit of the present disclosure under a first control mode.

In the first control method, the change time of the voltage on the second middle node is controlled to be longer than the preset time by slowing down the switching speed of the third and fourth switches of the second bridge arm. The first control method can be applied to the totem-pole PFC circuit 1a of the first embodiment shown in FIG. 3A. FIG. 4 is a schematic waveform of the totem-pole PFC circuit of the present disclosure under the first control method. In FIG. 4, Vgs_S1, Vgs_S2, Vgs_S3 and Vgs_S4 represent the gate-source voltages of the first switch S1, the second switch S2, the third switch S3 and the fourth switch S4 respectively, and Vds_S4 represents the drain-source voltage of the fourth switch S4 (i.e., the voltage on the second middle node). The first switch S1 and the second switch S2 of the first bridge arm are turned on and off alternately. In FIG. 4, the switching sequence of the switches of the first bridge arm is exemplified by continuous pulses rather than the actual waveforms of the gate-source voltages of the first and second switches S1 and S2 respectively. As shown in FIG. 4, the situation that the polarity of the AC power source Vac changes from positive to negative is taken as an example for illustration. Before the polarity of the AC power source Vac is changed, at time t0, the first bridge arm stops working (specifically, both the first switch S1 and the second switch S2 are turned off) firstly. Then, the second bridge arm stops working (specifically, the fourth switch S4 is turned off) at time t1. At time t2, the polarity of the AC power source Vac is changed, namely the time t2 is the zero crossing point. During the second time period from time t1 to time t3, neither the first bridge arm nor the second bridge arm works. After the second time period, at time t3, the third switch S3 is turned on, and the second bridge arm starts to work. During the first time period from time t3 to time t4, the voltage on the second middle node (i.e., the drain-source voltage Vds_S4 of the fourth switch S4) gradually increases and finally increases to the bus voltage at time t4. At time t5, the first bridge arm starts to work, and the first switch S1 and the second switch S2 are turned on and off alternately. Thereby, by controlling the switching speed of the third switch S3, the change time (i.e., the first time period from time t3 to time t4) of the voltage on the second middle node can be controlled to be longer than the preset time. In some embodiments, the second time period (time t1 to time t3) may be a dead time. During the dead time, all the switches are turned off so as to prevent the shoot-through problems of bridge arms.

Similarly, when the polarity of the AC power source Vac changes from negative to positive, the change time of the voltage on the second middle node (i.e., the first time period from time t9 to time t10) can also be controlled to be longer than the preset time by controlling the switching speed of the fourth switch S4. The situation that the polarity of the AC power source Vac changes from negative to positive is described specifically as follows. As shown in FIG. 4, before the polarity of the AC power source Vac is changed, at time t6, the first bridge arm stops working (both the first switch S1 and the second switch S2 are turned off) firstly. Then, the second bridge arm stops working (the third switch S3 is turned off) at time t7. At time t8, the polarity of the AC power source Vac is changed, namely the time t8 is the zero crossing point. During the second time period from time t7 to time t9, which are before and after the zero crossing point respectively, neither the first bridge arm nor the second bridge arm works. At time t9, the fourth switch S4 is turned on, and the second bridge arm starts to work. During the first time period from time t9 to time t10, the voltage on the second middle node (i.e., the drain-source voltage Vds_S4 of the fourth switch S4) gradually decreases and finally decreases to zero at time t10. At time t11, the first bridge arm starts to work, and the first switch S1 and the second switch S2 are turned on and off alternately.

In each half line frequency cycle of the AC power source Vac, the total working time of the first bridge arm is shorter than that of the second bridge arm. In addition, in the descriptions of the present disclosure, "the bridge arm works" means that at least one switch of the bridge arm may be in the on state, and "the bridge arm stops working" means that all the switches of the bridge arm are in the off state.

Figure 5A:
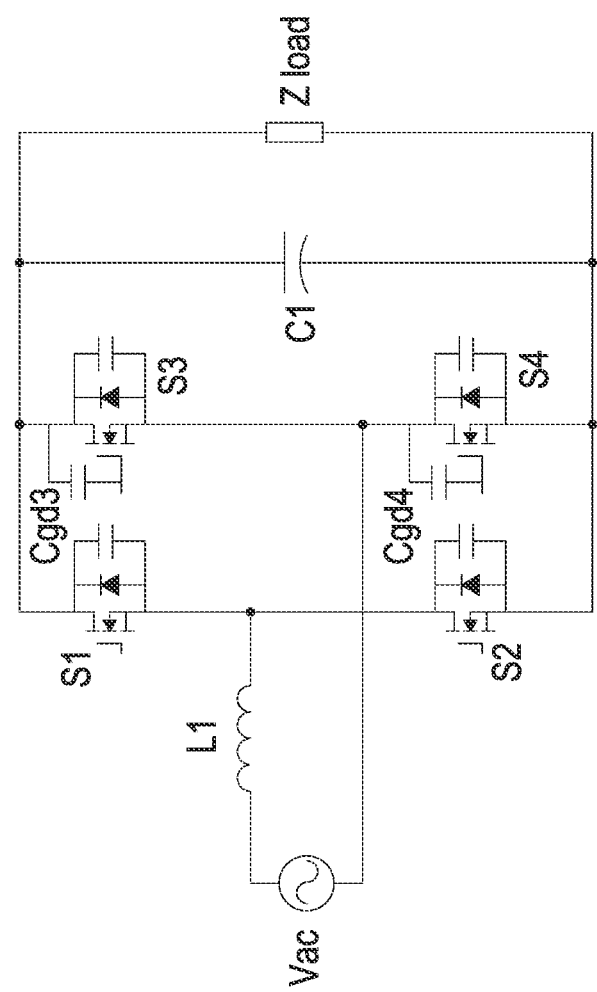
FIGS. 5A, 5B, 5C and 5D are schematic circuit diagrams showing different implementations of controlling the switching speed of the third and fourth switches of the second bridge arm.
Figure 5B:
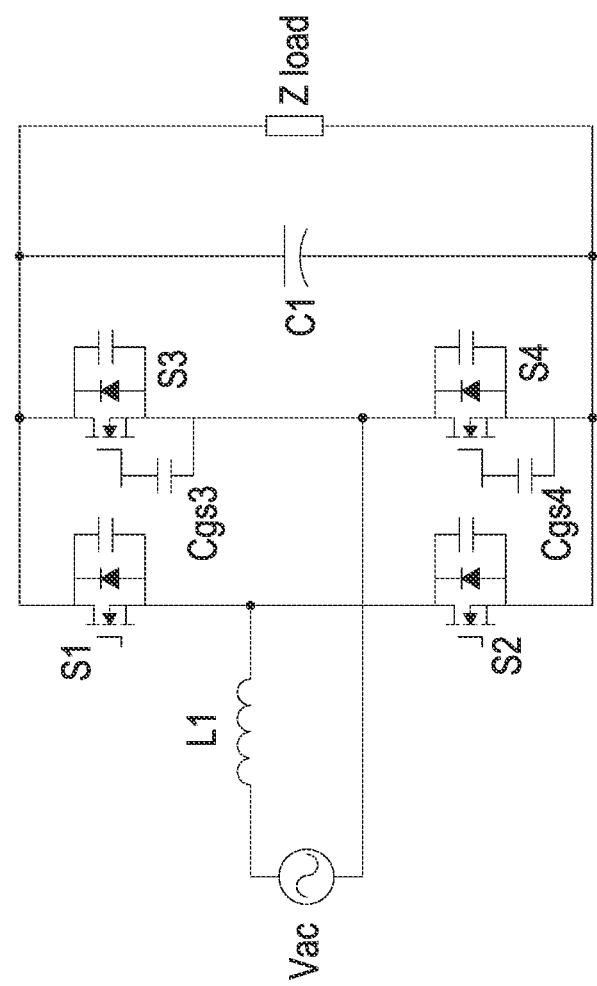
Figure 5C:
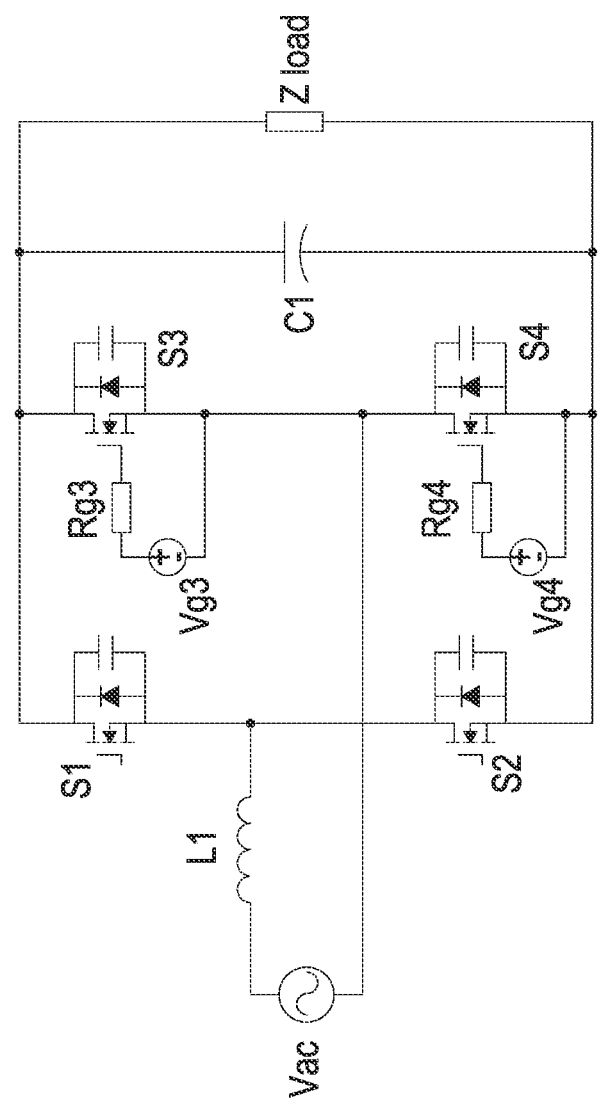
Figure 5D:
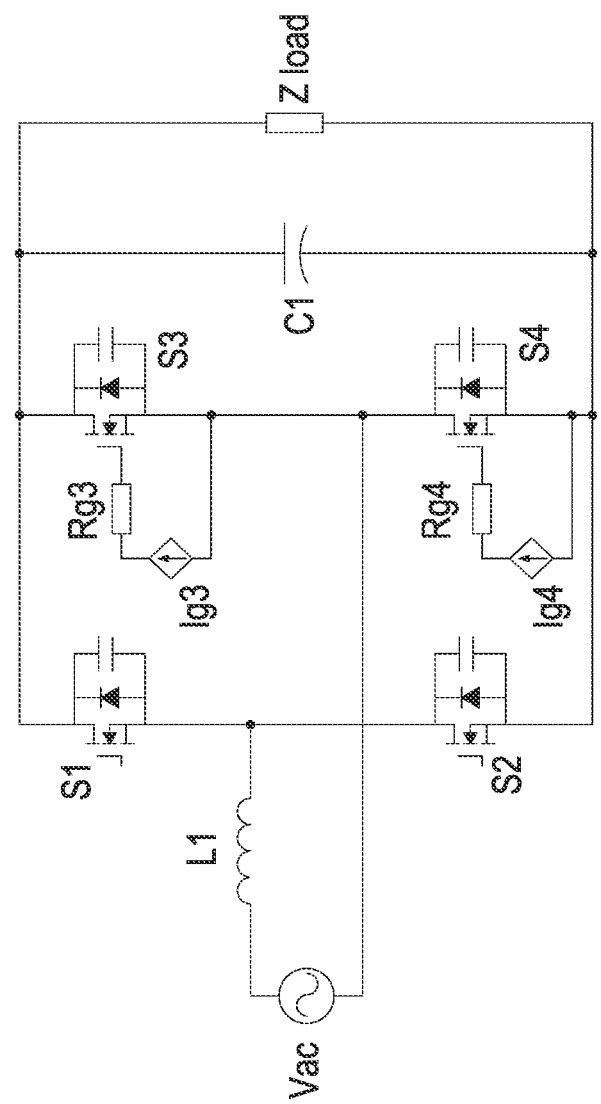

FIGS. 5A, 5B, 5C and 5D show different implementations of controlling the switching speed of the third and fourth switches S3 and S4 of the second bridge arm. In an embodiment, as shown in FIG. 5A, a first additional capacitor Cgd3 is disposed between the gate and drain of the third switch S3, and another first additional capacitor Cgd4 is disposed between the gate and drain of the fourth switch S4. Therefore, the switching speed of the third switch S3 and the fourth switch S4 is slowed down by the first additional capacitors Cgd3 and Cgd4. In an embodiment, as shown in FIG. 5B, a second additional capacitor Cgs3 is disposed between the gate and source of the third switch S3, and another second additional capacitor Cgs4 is disposed between the gate and source of the fourth switch S4. Therefore, the switching speed of the third switch S3 and the fourth switch S4 is slowed down by the second additional capacitors Cgs3 and Cgs4. In an embodiment, as shown in FIG. 5C, a driving resistance Rg3 between the gate and source of the third switch S3 and another driving resistance Rg4 between the gate and source of the fourth switch S4 are increased to slow down the switching speed of the third switch S3 and the fourth switch S4. In an embodiment, as shown in FIG. 5D, a driving current Ig3 of the third switch S3 and another driving current Ig4 of the fourth switch S4 respectively are decreased to slow down the switching speed of the third switch S3 and the fourth switch S4.

Figure 6:
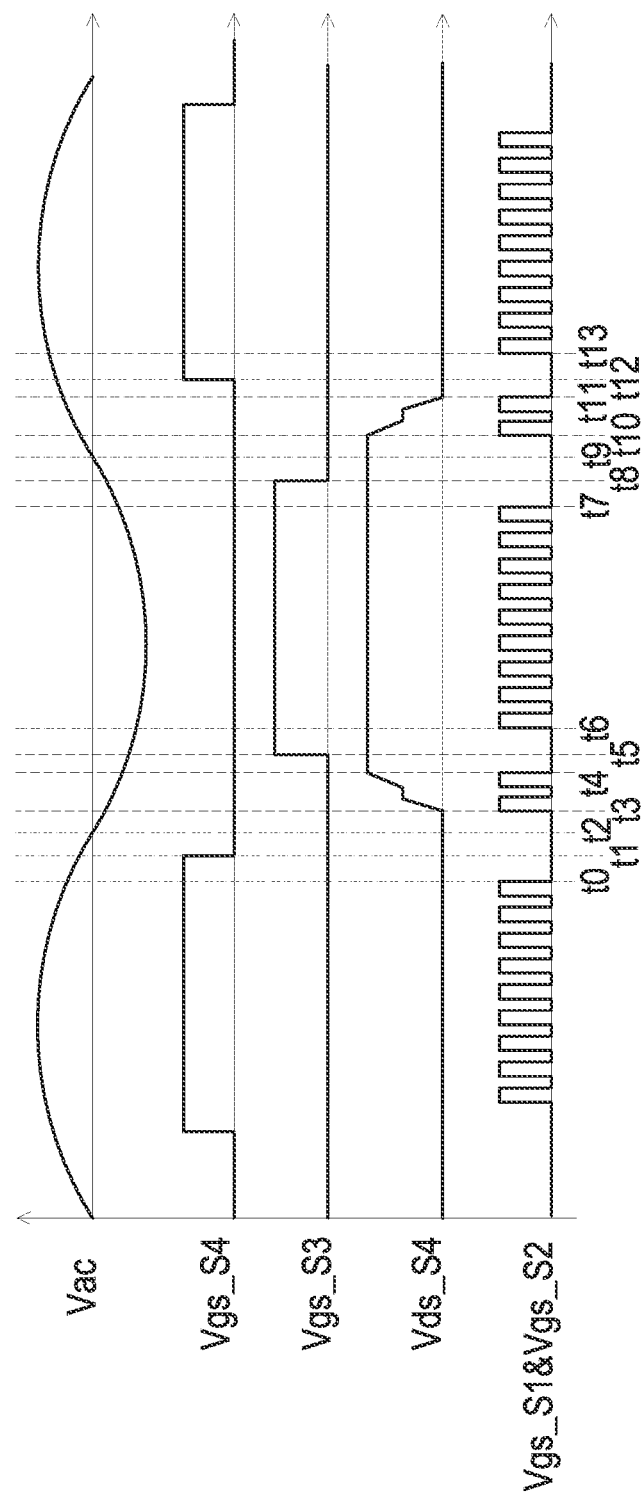
FIG. 6 is a schematic waveform of the totem-pole PFC circuit of the present disclosure under a second control mode.

In the second control method, the change time of the voltage on the second middle node is controlled to be longer than the preset time by controlling the switching sequence of the first and second switches S1 and S2 of the first bridge arm. The second control method can be applied to the totem-pole PFC circuits 1a and 1b of the first and second embodiment shown in FIG. 3A and FIG. 3B respectively. The second control method applied to the totem-pole PFC circuit 1a of the first embodiment shown in FIG. 3A is taken as an example for illustration. FIG. 6 is a schematic waveform of the totem-pole PFC circuit of the present disclosure under a second control method. As shown in FIG. 6, the situation that the polarity of the AC power source Vac changes from positive to negative is taken as an example. During the positive half cycle of the AC power source Vac, the third switch S3 of the second bridge arm is in the off state. Before the polarity of the AC power source Vac is changed, at time t0, the first bridge arm stops working (both the first switch S1 and the second switch S2 are turned off) firstly. Then, the second bridge arm stops working (the fourth switch S4 in the on state is turned off) at time t1. At time t2, the polarity of the AC power source Vac is changed, namely the time t2 is the zero crossing point. During the second time period from time t1 to time t3, which are before and after the zero crossing point respectively, neither the first bridge arm nor the second bridge arm works. At time t3, the first switch S1 of the first bridge arm starts to work. During the first time period from time t3 to time t4, the voltage on the second middle node (i.e., the drain-source voltage Vds_S4 of the fourth switch S4) gradually increases and finally increases to the bus voltage at time t4. At time t4, the first bridge arm stops working, namely the first switch S1 is turned off. At time t5, the second bridge arm starts to work (the third switch S3 is turned on). During the first time period from time t3 to time t4, by controlling the first switch S1 of the first bridge arm, the energy release from the capacitors between the drain and source of the third and fourth switches S3 and S4 of the second bridge arm can be controlled. Accordingly, the change speed of the voltage on the second middle node is controlled, thereby controlling the change time of the voltage on the second middle node to be longer than the preset time.

The change time (i.e., the time period between time t3 and time t4) of the voltage on the second middle node is controlled to be longer than the preset time by only controlling the switching of the first switch S1 or by controlling the alternate switching of the first and second switches S1 and S2 of the first bridge arm. In other words, during the first time period from time t3 to time t4, only the control for the switching of the first switch S1 needs to be ensured, and the second switch S2 can be allowed to work or be in the off state.

In addition, in the embodiment shown in FIG. 6, the first bridge arm stops working at time t4, and the first bridge arm doesn't work from time t4 to time t6. In another embodiment, the first bridge arm may work during the time period from time t4 to time t6, namely the first bridge arm keeps working from time t3 to time t7. Consequently, the change time (i.e., the time period between time t3 and time t4) of the voltage on the second middle node can be controlled to be longer than the preset time by ensuring the switching of the first switch S1 during the first time period from time t3 to time t4.

Similarly, when the polarity of the AC power source Vac changes from negative to positive, the change time of the voltage on the second middle node (i.e., the first time period from time t10 to time t11) can also be controlled to be longer than the preset time by controlling the second switch S2 of the first bridge arm. The situation that the polarity of the AC power source Vac changes from negative to positive is described specifically as follows. As shown in FIG. 6, before the polarity of the AC power source Vac is changed, at time t7, the first bridge arm stops working (both the first switch S1 and the second switch S2 are turned off) firstly. Then, the second bridge arm stops working (the third switch S3 in the on state is turned off) at time t8. At time t9, the polarity of the AC power source Vac is changed, namely the time t9 is the zero crossing point. During the second time period from time t8 to time t10, which are before and after the zero crossing point respectively, neither the first bridge arm nor the second bridge arm works. At time t10, the second switch S2 of the first bridge arm starts to work. During the first time period from time t10 to time t11, by controlling the switching sequence of the second switch S2 of the first bridge arm, the voltage on the second middle node (i.e., the drain-source voltage Vds_S4 of the fourth switch S4) gradually decreases and finally decreases to zero at time t11. At time t11, the first bridge arm stops working, namely the second switch S2 is turned off. At time t12, the second bridge arm starts to work (the fourth switch S4 in the off state is turned on). At time t13, the first bridge arm starts to work (the first and second switches S1 and S2 are turned on and off alternately). The first bridge arm doesn't work during the time period from time t11 to time t13 in the embodiment shown in FIG. 6, but not limited thereto. The first bridge arm may work during the time period from time t11 to time t13 in another embodiment. In addition, during the first time period from time 10 to time t1, only the second switch S2 of the first bridge arm is controlled to perform the switching operation, or both the first switch S1 and the second switch S2 are turned on and off alternately.

With regard to controlling the switching sequence of the first and second switches S1 and S2 of the first bridge arm during the first time period (from time t3 to time t4, or from time t10 to time t11), the present disclosure exemplifies two possible implementations in FIG. 7A, FIG. 7B, FIG. 8A and FIG. 8B.

Figure 7A:
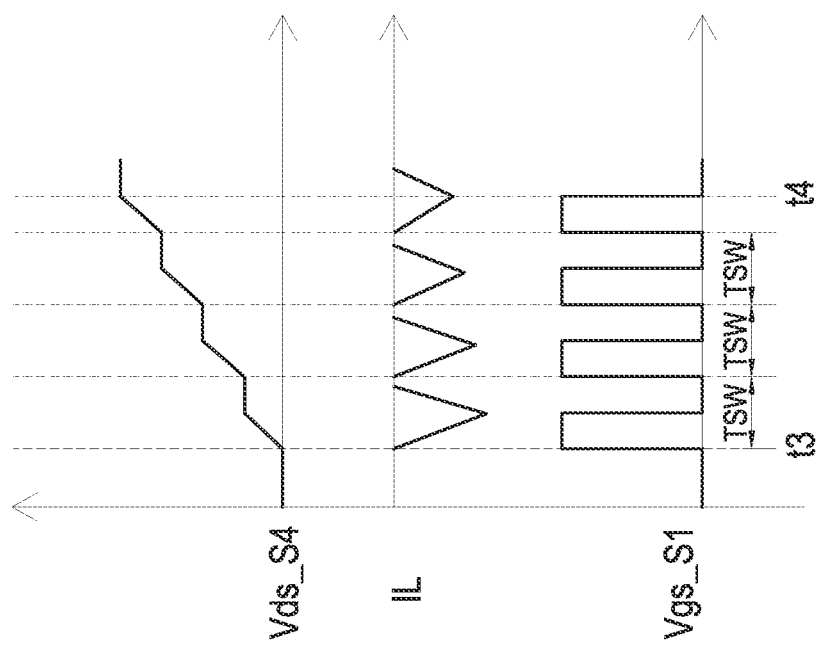

In an embodiment, during the first time period as shown in FIG. 7A and FIG. 7B (corresponding to the time period from time t3 to time t4 and the time period from time t10 to time t11 as shown in FIG. 6 respectively), the switching frequency of the first bridge arm is fixed (i.e., the switching cycle Tsw is fixed). The change time of the voltage on the second middle node is controlled to be longer than the preset time by adjusting the duty of the first switch S1 or the second switch S2. Taking FIG. 7A as an example, after the polarity of the AC power source Vac changes from positive to negative, and during the time period from time t3 to time t4 as shown in FIG. 6, the first switch S1 is controlled to work. In particular, when the first switch S1 is turned on, the junction capacitor on the third switch S3 discharges through the first switch S1, and the released energy is stored in the inductor L1. When the first switch S1 is turned off, the energy stored in the inductor L1 is transmitted to the bus capacitor C1 through the second switch S2. As the switching frequency of the first switch S1 is fixed, the discharge time of the junction capacitor on the third switch S3, which is equal to the change time of the voltage on the second middle node, can be controlled by adjusting the duty of the first switch S1. For example, as the switching frequency is fixed, if the voltage on second middle node increases from zero to VBUS or decreases from VBUS to zero within the preset time (e.g., 20 μs), it is determined that the voltage on the second middle node changes too fast, and the duty of the first switch S1 may be reduced accordingly. Under the same switching frequency, the less the duty is, the longer the change time of the voltage on the second middle node is. Therefore, the change time of the voltage on the second middle node can be increased by reducing the duty of the first switch S1. Similarly, as shown in FIG. 7B, after the polarity of the AC power source Vac changes from negative to positive and during the time period from time t10 to time t11 as shown in FIG. 6, the switching frequency of the second switch S2 is fixed. The discharge time of the junction capacitor on the third switch S4, which is equal to the change time of the voltage on the second middle node, can be controlled by adjusting the duty of the second switch S2. Accordingly, the change time of the voltage on the second middle node is ensured to be longer than the preset time. In addition, the fixed switching frequency may be set according to actual requirements and the preset time.

In another embodiment, as shown in FIG. 7A and FIG. 7B, during the first time period, the duty ratio of the first bridge arm is fixed, and the change time of the voltage on the second middle node is controlled to be longer than the preset time by adjusting the switching frequency of the first switch S1 or the second switch S2. For example, as the duty ratio is fixed, if the voltage on second middle node increases from zero to VBUS or decreases from VBUS to zero within the preset time (e.g., 20 μs), it is determined that the voltage on the second middle node changes too fast, and the switching frequency of the first switch S1 may be reduced accordingly. Under the same duty ratio, when the switching frequency is reduced, the switching cycle is increased, and the switching times within the preset time are reduced, thereby increasing the change time of the voltage on the second middle node.

Figure 8A:
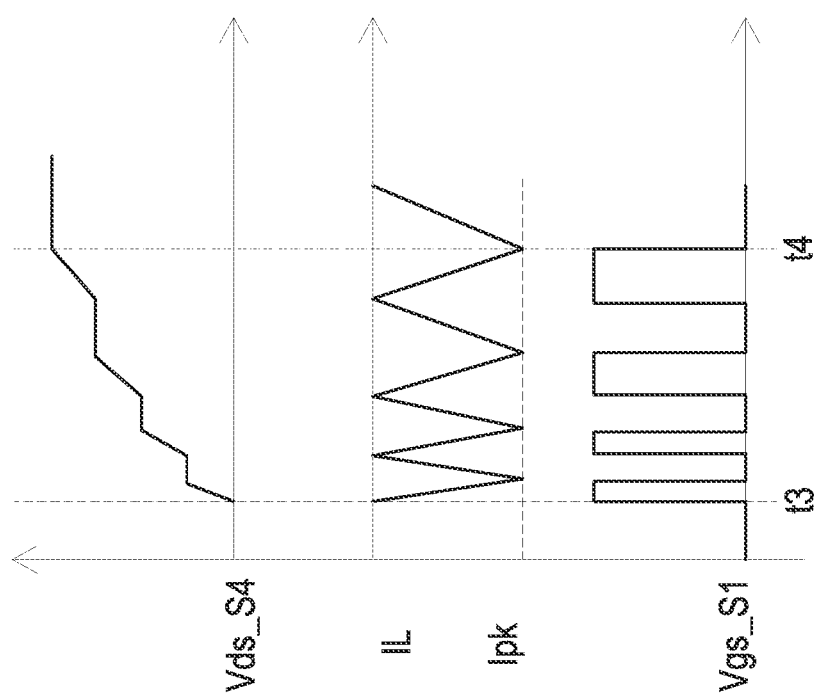

In another embodiment, during the first time period as shown in FIG. 8A and FIG. 8B (corresponding to the time period from time t3 to time t4 and the time period from time t10 to time t11 as shown in FIG. 6 respectively), the totem-pole PFC circuit 1a is controlled to work in the critical continuous mode through controlling the first switch S1. In this embodiment, the switching frequency of the first bridge arm is not fixed. The change time of the voltage on the second middle node is controlled to be longer than the preset time by controlling the peak value of the inductor current in every switching cycle. Wherein, the peak current mode control is applied to the totem-pole PFC circuit 1a. For example, as shown in FIG. 8A, after the polarity of the AC power source Vac changes from positive to negative, during the first time period from time t3 to time t4, the inductor current is detected. When the inductor current increases to the preset peak value Ipk, the first switch S1 is turned off, and the inductor current continues to flow through the second switch S2. When the inductor current decreases to zero, the first switch S1 is turned on again. As the first switch S1 is turned on, the junction capacitor on the third switch S3 discharges through the first switch S1, and the released energy is stored in the inductor L1. When the first switch S1 is turned off, the energy stored in the inductor L1 is transmitted to the bus capacitor C1 through the second switch S2. Since the inductor current is critically continuous, the average value Iav of the inductor current is half of the preset peak value Ipk. According to the formula C*U=Iav*t (C is the equivalent parasitic capacitance of the second middle node, and U is the voltage on the second middle node), the magnitude of Iav is controlled through controlling the magnitude of Ipk under the condition of fixed capacitance and voltage. Accordingly, the discharge time t of the capacitor can be controlled. During the time period from time t3 to time t4, the voltage on the inductor L1 gradually decreases with the change of the voltage on the second middle node. In order to obtain the same magnitude of Ipk, the time of the first switch S1 in the on state is increased accordingly. Therefore, by controlling the peak value of the inductor current, the discharge time of the junction capacitor on the third switch S3 can be controlled, thereby ensuring the change time of the voltage on the second middle node to be longer than the preset time.

Similarly, as shown in FIG. 8B, after the polarity of the AC power source Vac changes from negative to positive, the peak value of the inductor current is controlled (e.g., to equal the preset peak value Ipk) through the second switch S2, thereby controlling the discharge time of the junction capacitor on the fourth switch S4. Consequently, the change time of the voltage on the second middle node is ensured to be longer than the preset time. In addition, the preset peak value Ipk can be set according to actual requirements and the preset time.

In summary, the present disclosure provides a totem-pole PFC circuit. When the polarity of the AC power is changed, the totem-pole PFC circuit controls the change time of the voltage on the middle node of the line frequency bridge arm to be longer than a preset time. Consequently, the common mode noise caused by the voltage jump is suppressed. Specifically, the change time of the voltage on the middle node is controlled to be longer than the preset time by slowing down the switching speed of the third and fourth switches of the second bridge arm. Alternatively, the change time of the voltage on the middle node is controlled to be longer than the preset time by controlling the switching sequence of the first and second switches of the first bridge arm.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A totem-pole PFC circuit, having an input connected to an AC power source and an output providing a bus voltage, comprising: an inductor; a first bridge arm comprising a first switch and a second switch connected in series, wherein a first middle node connected between the first and second switches is coupled to a first terminal of the AC power source through the inductor; and a second bridge arm connected to the first bridge arm in parallel, wherein the second bridge arm comprises a third switch and a fourth switch connected in series, and a second middle node connected between the third and fourth switches is coupled to a second terminal of the AC power source;

wherein when a polarity of the AC power source is changed, a change time of a voltage on the second middle node is longer than a preset time, and the preset time is not less than 20 ps, wherein the change time is a first time period of the voltage on the second middle node increasing from zero to the bus voltage or a first time period of the voltage on the second middle node decreasing from the bus voltage to zero.

2. The totem-pole PFC circuit according to claim 1, wherein the first and second switches are MOSFETs, IGBTs, GaN transistors or SiC transistors.

3. The totem-pole PFC circuit according to claim 1, wherein the third and fourth switches are MOSETs, IGBTs, GaN transistors or SiC transistors.

4. The totem-pole PFC circuit according to claim 3, wherein the totem-pole PFC circuit controls the change time of the voltage on the second middle node to be longer than the preset time by slowing down a switching speed of the third and fourth switches of the second bridge arm.

5. The totem-pole PFC circuit according to claim 4, wherein there is a second time period starting before and ending after a moment that the polarity of the AC power source is changed, and neither the first bridge arm nor the second bridge arm works during the second time period.

6. The totem-pole PFC circuit according to claim 5, wherein before the polarity of the AC power source is changed, the first bridge arm stops working firstly, and then the second bridge arm stops working; wherein after the polarity of the AC power source is changed, the second bridge arm starts to work firstly, and then the first bridge arm starts to work.

7. The totem-pole PFC circuit according to claim 4, wherein a first additional capacitor is disposed between a gate and a drain of the third switch, and another first additional capacitor is disposed between a gate and a drain of the fourth switch.

8. The totem-pole PFC circuit according to claim 4, wherein a second additional capacitor is disposed between a gate and a source of the third switch, and another second additional capacitor is disposed between a gate and a source of the fourth switch.

9. The totem-pole PFC circuit according to claim 4, wherein the totem-pole PFC circuit slows down the switching speed of the third and fourth switches by increasing a driving resistance between a gate and a source of the third switch and a driving resistance between a gate and a source of fourth switch respectively.

10. The totem-pole PFC circuit according to claim 4, wherein the totem-pole PFC circuit slows down the switching speed of the third and fourth switches by decreasing a driving current of the third switch and a driving current of fourth switches.

11. The totem-pole PFC circuit according to claim 1, wherein the totem-pole PFC circuit controls the change time of the voltage on the second middle node to be longer than the preset time by controlling a switching sequence of the first and second switches of the first bridge arm.

12. The totem-pole PFC circuit according to claim 11, wherein the third and fourth switches are diodes, MOSFETs, IGBTs, GaN transistors or SiC transistors.

13. The totem-pole PFC circuit according to claim 12, wherein there is a second time period starting before and ending after a moment that the polarity of the AC power source is changed, and neither the first bridge arm nor the second bridge arm works during the second time period.

14. The totem-pole PFC circuit according to claim 13, wherein before the polarity of the AC power source is changed, the first bridge arm stops working firstly, and then the second bridge arm stops working; wherein after the polarity of the AC power source is changed, the first bridge arm starts to work firstly, and then the second bridge arm starts to work.

15. The totem-pole PFC circuit according to claim 14, wherein after the second time period, the first switch of the first bridge arm is controlled to work during the first time period in a negative half cycle of the AC power source, and the second switch of the first bridge arm is controlled to work during the first time period in a positive half cycle of the AC power source.

16. The totem-pole PFC circuit according to claim 15, wherein during the first time period, a switching frequency of the first switch or the second switch is fixed, and a duty ratio of the first switch or the second switch is adjusted for controlling the change time of the voltage on the second middle node.

17. The totem-pole PFC circuit according to claim 15, wherein during the first time period, a duty ratio of the first switch or the second switch is fixed, and a switching frequency of the first switch or the second switch is adjusted for controlling the change time of the voltage on the second middle node.

18. The totem-pole PFC circuit according to claim 15, wherein during the first time period, a peak current mode control is applied to the totem-pole PFC circuit through the first switch or the second switch, and the totem-pole PFC circuit is controlled to work in a critical continuous mode.

* * * * *